United States Patent [19]
Beck et al.

[11] Patent Number: 5,427,728
[45] Date of Patent: Jun. 27, 1995

[54] METHOD OF MAKING A PLURALITY OF TOOTHED BELT CONSTRUCTIONS

[75] Inventors: Harold D. Beck, Strafford; R. Mark Mitchell, Verona; Jeffrey A. Swane; Dan W. Virtue, both of Springfield, all of Mo.

[73] Assignee: Dayco Products, Inc., Dayton, Ohio

[21] Appl. No.: 123,619

[22] Filed: Sep. 17, 1993

Related U.S. Application Data

[60] Continuation of Ser. No. 926,493, Aug. 7, 1992, abandoned, which is a division of Ser. No. 732,533, Jul. 18, 1991, abandoned.

[51] Int. Cl.6 .................... B29C 43/18; B29D 29/08
[52] U.S. Cl. .................................. 264/229; 156/140; 156/141; 264/259; 264/326; 425/34.2; 425/818; 474/205; 474/266
[58] Field of Search ............... 264/229, 231, 236, 257, 264/326, 259, 266; 425/34.2, 818; 156/137, 138, 139, 140, 141; 474/205, 249, 252, 238, 250, 266

[56] References Cited

U.S. PATENT DOCUMENTS

| | | | |
|---|---|---|---|
| 3,078,206 | 2/1963 | Skura | 156/140 |
| 4,392,842 | 7/1983 | Skura et al. | 474/205 |
| 4,414,047 | 11/1983 | Wetzel et al. | 156/138 |
| 4,445,879 | 5/1984 | Cicognani | 474/205 |
| 4,486,375 | 12/1984 | Hirai | 156/140 |

FOREIGN PATENT DOCUMENTS

| | | | |
|---|---|---|---|
| 345367 | 12/1989 | European Pat. Off. | 156/141 |
| WO91/02178 | 2/1991 | WIPO | 474/266 |

Primary Examiner—Mathieu D. Vargot
Attorney, Agent, or Firm—Joseph V. Tassone

[57] ABSTRACT

A method of making a plurality of toothed belt constructions and a set of such belt constructions are provided, the method including the steps of disposing tubular sleeves of stretchable fabric material respectively onto a plurality of toothed mold members having different diameters, forcing mold material against the outside surfaces of the sleeves to tend to stretch the fabric material into the grooves of the toothed mold members as the mold material enters the grooves of the mold members so that the resulting toothed belt constructions will have the fabric material thereof carried in certain positions relative to the respective teeth thereof, and forming the sleeves from the same fabric material and with the same diameters in the nonstretched condition thereof.

9 Claims, 2 Drawing Sheets

METHOD OF MAKING A PLURALITY OF TOOTHED BELT CONSTRUCTIONS

CROSS REFERENCE TO RELATED APPLICATIONS

This application is a continuation patent application of its parent patent application, Ser. No. 926,493, filed Aug. 7, 1992, now abandoned, which, in turn, is a divisional patent application of its parent patent application, Ser. No. 732,533, filed Jul. 18, 1991, now abandoned.

BACKGROUND OF THE INVENTION

1. Field of the Invention

This invention relates to a new method of making a plurality of toothed belt constructions and to a new set of such belt constructions.

2. Prior Art Statement

It is known to provide a method of making a plurality of toothed belt means comprising the steps of disposing tubular sleeves of stretchable fabric material respectively onto a plurality of toothed mold members having different diameters, and forcing mold material against the outside surfaces of the sleeves to tend to stretch the fabric material into the grooves of the toothed mold members as the mold material enters the grooves of the mold members so that the resulting toothed belt means will have the fabric material thereof carried in certain positions relative to the respective teeth thereof. For example, see the U.S. Pat. Nos. to Breher, 4,443,396 and to Valerio et al, 3,419,449.

It is also known to have fabric material disposed in each tooth of a toothed belt construction between the root and tip thereof. For example, see the U.S. Pat. No. to Skura et al, 4,392,842.

SUMMARY OF THE INVENTION

It is one feature of this invention to provide a new method of making a plurality of toothed belt means respectively having different diameters and still being formed from sleeves of the same fabric material and having the same diameters in the nonstretched conditions thereof so that the fabric material will be carried in certain positions relative to the respective teeth thereof.

In particular, it is well known to dispose a tubular sleeve of stretchable fabric material onto a tooth mold member and then forcing mold material against the outside surface of the sleeve to tend to stretch the fabric material into the grooves of the toothed mold member as the mold material enters the grooves of the mold member so that the resulting toothed belt means will have the fabric material thereof carried in a certain position relative to the respective teeth thereof. For example, see the aforementioned U.S. Pat. Nos. to Breher, 4,443,396, and the aforementioned to Valerio et al, 3,419,449, whereby these two U.S. patents are being incorporated into this disclosure by this reference thereto.

While the toothed belt constructions being made by the methods set forth in the aforementioned two U.S. Pat. Nos. 4,443,396 and 3,419,449, have the sleeves of fabric material thereof lining the exterior peripheral surface means of the teeth of the resulting toothed belt constructions thereof, it was found according to the teachings of this invention that the sleeve of fabric material could be disposed anywhere from the root of each tooth to the outer periphery or tip of the tooth and will still provide an improved belt life over belts produced without such fabric material.

Therefore, it was further found according to the teachings of this invention that the same sized sleeve of the same fabric material can be utilized to produce belt constructions having various diameters so that the resulting method will be less costly than using sleeves of fabric material which must be formed so that each only makes a tooth face as in the prior mentioned U.S. Pat. Nos. 4,443,396 and 3,419,449.

For example, one embodiment of this invention provides a method of making a plurality of toothed belt means comprising the steps of disposing tubular sleeves of stretchable fabric material respectively onto a plurality of toothed mold members having different diameters, forcing mold material against the outside surfaces of the sleeves to tend to stretch the fabric material into the grooves of the toothed mold members as the mold material enters the grooves of the mold members so that the resulting toothed belt means will have the fabric material thereof carried in certain positions relative to the respective teeth thereof, and forming the sleeves from the same fabric material and with the same diameters in the nonstretched conditions thereof.

Accordingly, it is an object of this invention to provide a new method of making a plurality of toothed belt means, the method of this invention having one or more of the novel features of this invention as set forth above or hereinafter shown or described.

Another object of this invention is to provide a new set of a plurality of toothed belt constructions, the new set of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENT

Figure 1:
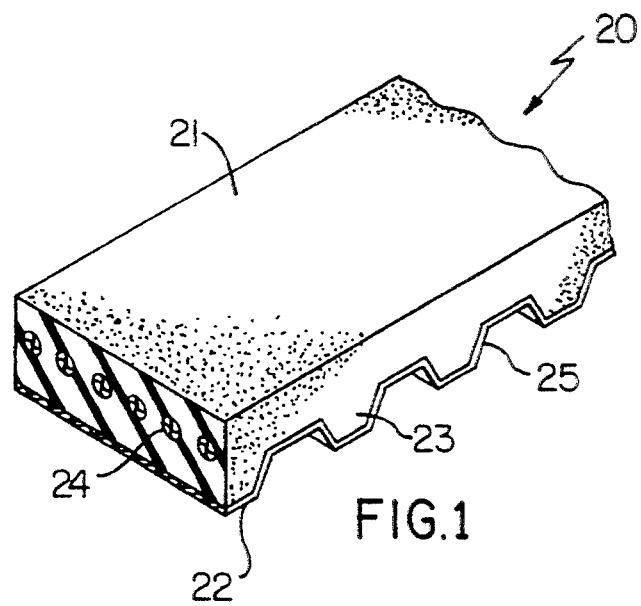
FIG. 1 is a fragmentary perspective view partially in cross section illustrating the toothed belt construction of this invention formed by the apparatus of FIG. 5.

While the various features of this invention are hereinafter illustrated and described as being particularly adapted to provide belt constructions that have load carrying cord means, it is to be understood that the various features of this invention can be utilized singly or in various combinations thereof to provide toothed belt constructions having other types of load carrying means as desired.

Therefore, this invention is not to be limited to only the embodiment illustrated in the drawings, because the drawings are merely utilized to illustrate one of the wide variety of uses of this invention.

Referring now to FIG. 1, a new endless toothed belt construction of this invention is generally indicated by the reference numeral 20 and comprises an outer peripheral surface means 21, an inner peripheral surface means 22 defined by a plurality of radially inwardly directed teeth 23, a reinforcing cord means 24, and a teeth reinforcing fabric means 25 lining the teeth 23 whereby it can be see that the toothed belt construction 20 of this invention has a configuration that is well known in the art, such as set forth in the aforementioned U.S. Pat. Nos. to Breher, No. 4,443,396, and to Valerio et al, No. 3,419,449.

Figure 2:
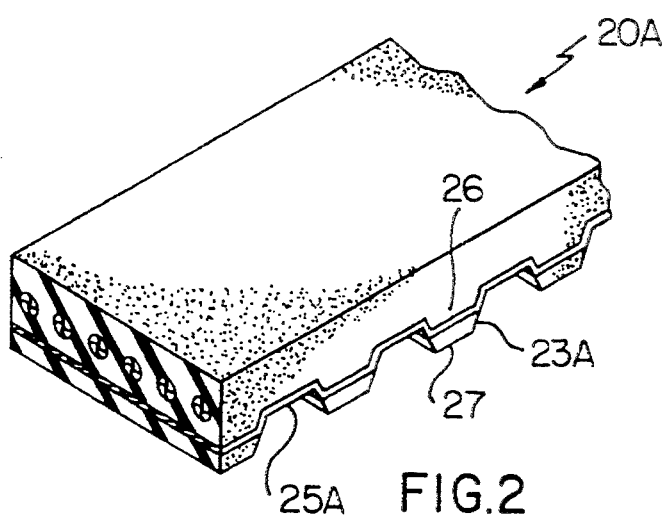
FIG. 2 is a view similar to FIG. 1 and illustrates another toothed belt construction of this invention that is formed by the apparatus of FIG. 6.

Another endless toothed belt construction of this invention is generally indicated by the reference numeral 20A in FIG. 2 and parts thereof similar to the belt construction 20 previously described are indicated by like reference numerals followed by the reference letter "A".

As illustrated in FIG. 2, the belt construction 20A is substantially identical to the belt construction 20 previously described except that the diameter of the belt construction 20A is larger than the diameter of the belt construction 20 as will be apparent hereinafter and has the fabric material 25A thereof embedded in the teeth 23A intermediate the roots 26 thereof and the tips 27 thereof as illustrated in FIG. 2.

Figure 3:
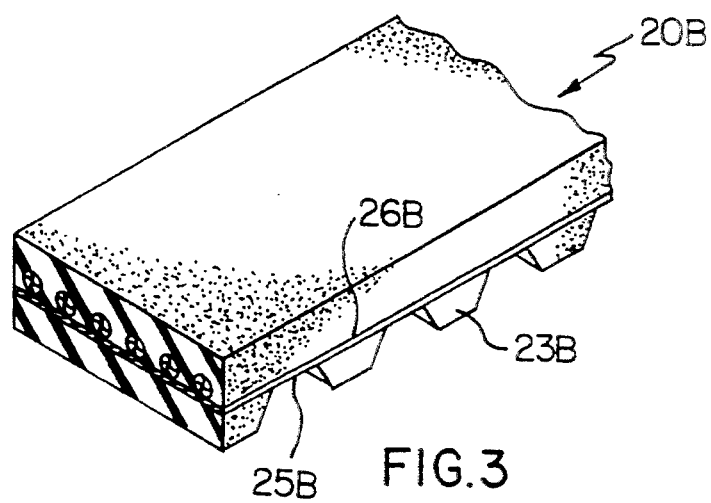
FIG. 3 is a view similar to FIG. 1 and illustrates another toothed belt construction of this invention that is formed by the method illustrated in FIG. 7.

Another endless toothed belt construction of this invention is generally indicated by the reference numeral 20B in FIG. 3 and parts thereof similar to the belt constructions 20 and 20A previously described are indicated by like reference numerals followed by the reference letter "B".

As illustrated in FIG. 3, the belt construction 20B is substantially the same as the belt constructions 20 and 20A previously described except that the diameter of the belt construction 20B is larger than the diameters of the belt constructions 20 and 20A as will be apparent hereinafter and the fabric material 25B thereof is located at the roots 26B of the teeth 23B as illustrated in FIG. 3.

Therefore, it can be seen that it is a feature of this invention to provide a set of a plurality of toothed belt constructions wherein the fabric material for the teeth thereof is located at the outer tips thereof so as to line the teeth thereof, is disposed at the roots of the teeth or is embedded in the teeth anywhere between the roots thereof and the tips thereof as it has been found according to the teachings of this invention that merely providing the fabric material so as to be in any position relative to the teeth thereof improves the belt life over a similar belt construction which does not utilize any fabric material in connection with the teeth thereof.

It has been further found according to the teachings of this invention that the fabric material for forming the belt constructions of this invention can be disposed in a seamless sleeve form, be the same fabric material and have the same diameters in the nonstretched conditions thereof so as to respectively form a plurality or set of toothed belt constructions having different diameters with each belt construction having the sleeve of fabric material thereof disposed somewhere relative to the teeth thereof to reinforce such teeth.

In one working embodiment of this invention, the fabric material comprises a knitted seamless nylon stocking that has a circumferential length in the nonstretched condition thereof of approximately 6.0 inches and has a circumferential length of approximately 14.0 inches when fully stretched so that no residual stretch characteristic remains therein. Such a sleeve of fabric material has been utilized to form a toothed belt construction wherein the pitch length thereof is approximately 7.5072 inches, the thickness thereof is approximately 0.045 of an inch and the number of teeth is ninety-two whereby the outside diameter of the toothed belt construction is approximately $2\frac{1}{4}$ inches.

It is to be understood that while certain dimensions, etc., have been set forth above for one working embodiment of this invention, such dimensions, etc., are not to be a limitation on this invention as other dimensions, etc., can be utilized, as desired.

Figure 5:
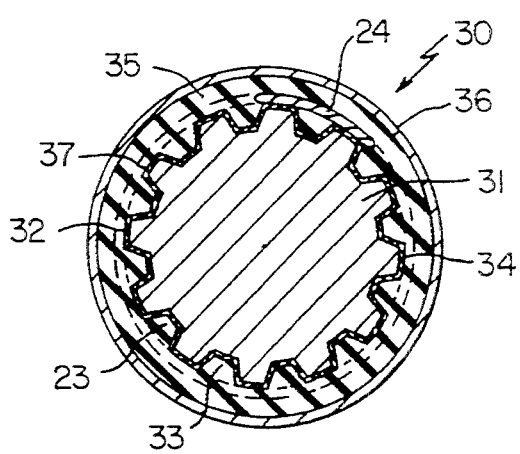
FIG. 5 is a cross-sectional view illustrating the apparatus utilized to make the toothed belt construction of this invention that is illustrated in FIG. 1.
Figure 6:
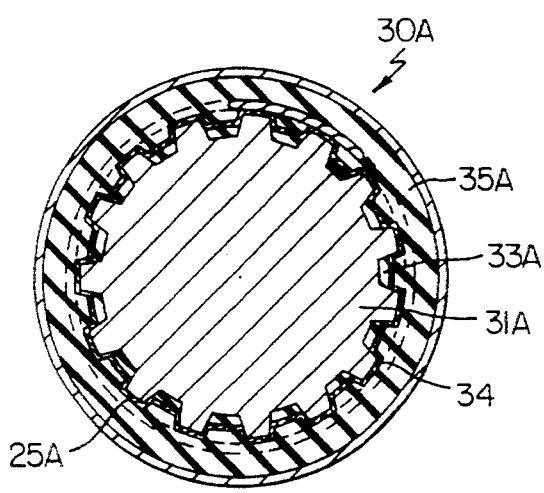
FIG. 6 is a view similar to FIG. 5 and illustrates the apparatus for forming the toothed belt construction of this invention that is illustrated in FIG. 2 and that has a larger diameter than the diameter of the toothed belt construction of FIG. 1.
Figure 7:
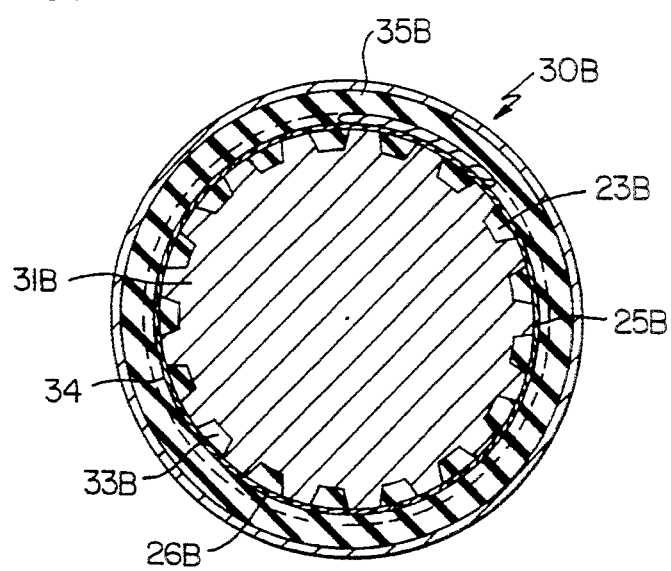
FIG. 7 is a view similar to FIG. 5 and illustrates the apparatus for forming the toothed belt construction of this invention that is illustrated in FIG. 3 and that has a larger diameter than the diameters of the toothed belt constructions of FIGS. 2 and 3.

The belt constructions 20, 20A and 20B of this invention can be respectively formed by the apparatus 30, 30A and 30B illustrated respectively in FIGS. 5, 6 and 7 wherein it can be seen that the apparatus 30, 30A and 30B are substantially identical except that the apparatus 30A is larger in diameter than the apparatus 30 and the apparatus 30B is larger in diameter than the apparatus 30A whereby only the details of the structure and method of making the belt construction 20 with the apparatus 30 of FIG. 5 will now be described with the understanding that such description equally applies to the method of using the apparatus 30A and 30B for forming the belt constructions 20A and 20B.

Figure 4:
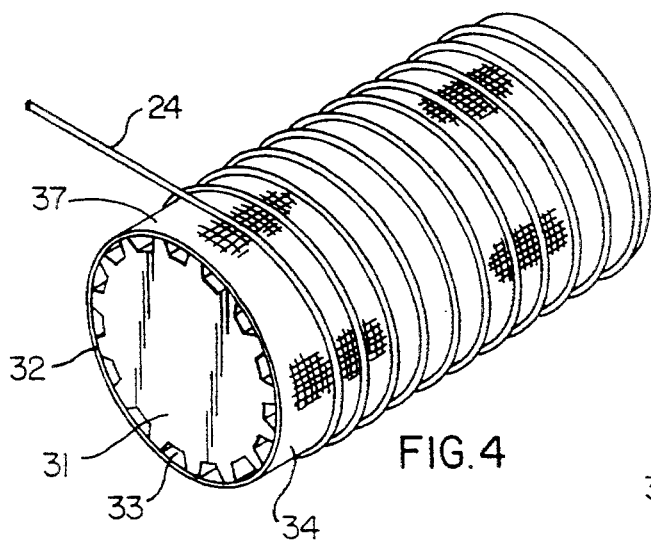
FIG. 4 is a perspective view illustrating one of the steps in the method of this invention for forming one of the toothed belt constructions of this invention.

As illustrated in FIGS. 4 and 5, the apparatus 30 includes a substantially cylindrical toothed mold member 31 having an outer peripheral surface means 32 provided with a plurality of longitudinally disposed and equally spaced apart grooves 33 which will form the teeth 23 of the belt construction 20 of this invention, the mold member 31 being formed of any suitable material, such as the metallic material illustrated in the drawings.

A stretchable sleeve 34 of seamless knitted fabric material is axially disposed on the mold member 31 by causing relative movement between the mold member 31 and the sleeve 34 so that the sleeve 34 is actually in a stretched condition on the mold member 31 but has a sufficient residual stretch characteristic therein so that the sleeve 34 will stretch fully into the grooves 33 of the mold member 31 to line the same in the manner illustrated in FIG. 5 when mold material 35 is injected into the apparatus 30 between the mold member 31 and an outer surrounding cylindrical casing 36 so as to engage against the outside surface 37 of the sleeve 34 and force the sleeve 34 into the grooves 33 of the mold member 31 to line the grooves 33 and, thus, line the resulting teeth 23 of the toothed belt construction 20 being formed in the apparatus 30 in the manner fully set forth in the aforementioned U.S. Pat. No. to Breher, 4,443,396.

However, before the mold member 31 is disposed in the outer surrounding casing 36 of the apparatus 30, a suitable tensile cord means 24 is wrapped in a helical manner on the outer peripheral surface 37 of the sleeve 34 in the manner illustrated in FIG. 4 so that the mold material 35 will exude through the spacings between the coils of the cord means 24 to form the teeth 23 in the manner previously set forth.

Once the mold material 35 has been exuded into the apparatus 30 in the manner illustrated in FIG. 5 to complete the configuration of the endless toothed belt construction 20, the material 35 can be solidified in the apparatus 30 in a manner well known in the art, the mold material 35 comprising any suitable polymeric material normally utilized to form toothed belt constructions.

The resulting toothed belt construction 20 is removed from the apparatus 30 in a manner well known in the art and comprises a relatively wide belt sleeve means whereby individual narrower toothed belts can be cut from the belt sleeve also in a manner well known in the art and as illustrated in FIG. 1. For example see the aforementioned U.S. Pat. No. to Valerio, 3,419,449.

Thus, it can be seen that when forming the belt construction 20A with the apparatus 30A of FIG. 6, the same belt sleeve 34 is being utilized with the mold member 31A whereby the sleeve 34 must be in a greater stretched condition when initially disposed onto the mold member 31A than when disposed on the mold member 31 previously described so that the resulting residual stretch characteristic of the sleeve 34 is less than the residual stretch characteristic of the sleeve 34 when on the mold member 31. Thus, when the mold material 35A is disposed in the apparatus 30A, the mold material 35A will exude against the fabric material 25A and carry the same along therewith into the grooves 33A of the mold member 31A and will exude through the fabric material 25A once the remaining stretch characteristic thereof has been used up so that the material 35A exudes beyond the material 25A in each groove 33A as illustrated in FIG. 6 and FIG. 2.

Likewise, since the mold member 31B of the apparatus 30B of FIG. 7 has a greater diameter than the diameter of the mold member 31A of FIG. 6, and since the same sleeve 34 of fabric material is being utilized to initially be disposed thereon as in the apparatus 30 and 30A, it may be found that the entire stretch characteristic of the sleeve 34 is used up in merely placing the sleeve 34 onto the mold member 31B so that when the mold material 35B is subsequently disposed into the apparatus 30B, the mold material 35B will exude through the material 25B without carrying the same into the grooves 33B so that the fabric material 25B will merely be disposed at the roots 26B of the resulting teeth 23B as illustrated in FIGS. 3 and 7.

Therefore, it can be seen that it is a unique feature of this invention to utilize the same sleeve of fabric material for forming belt constructions that have different diameters as such sleeve of fabric material improves the belt life of the resulting toothed belt construction regardless of where the fabric material ends up in the teeth thereof as the fabric material may be disposed at the outer tips of the teeth so as to line the teeth, be disposed at the roots thereof or be disposed in the teeth anywhere between the tips and the roots thereof and still perform a belt life increasing function as previously set forth.

Therefore, it can be seen that this invention not only provides a new method of making a plurality of toothed belt constructions, but also this invention provides a new set of a plurality of toothed belt constructions.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a method of making a plurality of toothed belt means some of which have larger inside diameters than the inside diameters of the others, the method comprising the steps of disposing tubular sleeves of stretchable fabric material respectively onto a plurality of toothed mold members having different diameters, and forcing mold material against the outside surfaces of said sleeves to tend to stretch said fabric material into the grooves of said toothed mold members as said mold material enters the grooves of said mold members so that said resulting toothed belt means will have said fabric material thereof carried in certain positions relative to the respective teeth thereof, the improvement comprising the steps of forming said sleeves from the same fabric material and with the same diameters in the nonstretched conditions thereof, and forming said sleeves to each have a circumferential length in the fully stretched condition thereof that is at least twice the circumferential length in the nonstretched condition thereof so that the same is disposed substantially across the roots of the teeth of said toothed belt means when said mold member being utilized at that time has a diameter that substantially corresponds to the diameter of said sleeve in the fully stretched condition thereof and so that the same substantially lines the outer peripheral surfaces of the teeth of said toothed belt means when said mold member being utilized at that time has a diameter that substantially corresponds to the diameter of said sleeve in the nonstretched condition thereof.

2. A method as set forth in claim 1 and including the step of forming each sleeve to be seamless.

3. A method as set forth in claim 1 wherein the step of disposing said sleeves of fabric material respectively onto said plurality of mold members comprises the step of causing axial movement between said sleeves and said mold members.

4. A method as set forth in claim 3 wherein the step of disposing said sleeves onto said plurality of mold members comprises the step of circumferentially stretching said sleeves as said sleeves and said mold members are being axially moved.

5. A method as set forth in claim 4 wherein each sleeve on its respective mold member has a residual stretch characteristic after being stretched onto its respective mold member and before the step of forcing mold material against said outside surface thereof.

6. A method as set forth in claim 5 wherein one of said toothed belt means has the sleeve of fabric material thereof disposed in the teeth thereof after the mold material has completely entered the grooves of said respective mold members by exuding through said fabric material.

7. A method as set forth in claim 1 wherein said stretchable fabric material comprises a stretchable knit fabric material.

8. A method as set forth in claims 7 wherein said stretchable knit fabric material comprises a nylon stocking.

9. A method as set forth in claim 8 wherein one of said resulting toothed belt means has an outside diameter of approximately 2¼ inches.

* * * * *